United States Patent
Usui et al.

(10) Patent No.: US 6,889,660 B2
(45) Date of Patent: May 10, 2005

(54) FUEL RAIL ASSEMBLY AND FORMING METHOD

(75) Inventors: Masayoshi Usui, Numazu (JP); Toshikazu Watanabe, Shizuoka (JP)

(73) Assignee: Usui Kokusai Sangyo Kaisha Ltd., Shizuoka (JP)

( * ) Notice: Subject to any disclaimer, the term of this patent is extended or adjusted under 35 U.S.C. 154(b) by 0 days.

(21) Appl. No.: 10/664,159

(22) Filed: Sep. 17, 2003

(65) Prior Publication Data

US 2004/0118382 A1 Jun. 24, 2004

(30) Foreign Application Priority Data

Sep. 25, 2002 (JP) .......................................... 2002-278365

(51) Int. Cl.[7] .............................................. F02M 55/02
(52) U.S. Cl. ............................ 123/456; 123/469; 285/24
(58) Field of Search ................................. 123/456, 468, 123/469, 470; 285/24, 288.1

(56) References Cited

U.S. PATENT DOCUMENTS

| | | | |
|---|---|---|---|
| 4,132,097 A | 1/1979 | Ames ............................ | 72/71 |
| 4,454,741 A | 6/1984 | Hoogenboom ................. | 72/71 |
| 5,957,507 A * | 9/1999 | Asada ........................ | 285/189 |
| 6,374,806 B1 * | 4/2002 | Keeley et al. .............. | 123/456 |
| 6,463,909 B2 * | 10/2002 | Asada et al. ................ | 123/456 |
| 6,505,607 B1 * | 1/2003 | Mattes ........................ | 123/456 |
| 6,609,502 B1 * | 8/2003 | Frank ......................... | 123/469 |
| 6,651,627 B2 * | 11/2003 | Zdroik et al. ............... | 123/456 |
| 6,761,149 B2 * | 7/2004 | Frank ......................... | 123/456 |
| 2003/0127852 A1 * | 7/2003 | Usui ........................ | 285/125.1 |

FOREIGN PATENT DOCUMENTS

| | | |
|---|---|---|
| JP | 9-280464 | 10/1997 |
| JP | 9-287687 | 11/1997 |
| JP | 11-257187 | 9/1999 |
| JP | 2000-88167 | 3/2000 |
| WO | 96/18062 | 6/1996 |

* cited by examiner

*Primary Examiner*—Weilun Lo
(74) *Attorney, Agent, or Firm*—Wenderoth, Lind & Ponack, L.L.P.

(57) ABSTRACT

A fuel rail assembly for supplying fuel to a plurality of fuel injectors in an engine is provided. This assembly comprises an elongated conduit having a longitudinal fuel passage therein, a fuel inlet pipe fixed to an end or a side of the conduit, and a plurality of branch pipes. The basal end of each branch pipe is adapted to communicate with the fuel passage. The distal end of each branch pipe is provide with a connecting member for connecting to a tip of a fuel injector. The wall of the conduit is provided with holes for receiving the basal ends of the branch pipes. Around each hole an inner collar and an outer collar are integrally formed with the conduit wall, and each branch pipe is fixed to the collars by brazing or welding. The drilling work is performed by a special drilling tool.

16 Claims, 6 Drawing Sheets

FUEL RAIL ASSEMBLY AND FORMING METHOD

BACKGROUND OF THE INVENTION

This invention relates to a fuel rail assembly for an internal combustion engine, especially for an automotive engine, equipped with an electronic fuel injection system. The fuel rail assembly delivers pressurized fuel supplied from a fuel pump toward intake passages or chambers via associated fuel injectors. The assembly is used to simplify installation of the fuel injectors and the fuel supply passages on the engine. This Invention is more particularly related to connecting constructions between the conduit (main pipe) having a fuel passage therein and branch pipes, and to a method of forming them.

Fuel rails are popularly used for electronic fuel injection systems of gasoline engines. The fuel rail delivers pressurized fuel from the conduit through several branch pipes toward a corresponding fuel injector. In diesel engines, the similar fuel rail is called a common rail and is usually designed to withstand extremely high pressure of diesel fuel. Due to the high pressure of fuel liquid, pressure fluctuations, mechanical vibrations, and dimensional changes under heat, there are drawbacks of fuel leakage from the connections between the conduit and the branch pipes.

Japanese patent unexamined publication Nos. 9-280464, 9-287687, 11-257187, 2000-88167, and PCT publication WO96/18062 disclose connecting constructions between the conduit (main pipe) and the branch pipes of a fuel rail (gasoline engine) and a common rail (diesel engine).

U.S. Pat. No. 4,132,097 issued on Jan. 2, 1979 entitled "Method for forming collared holes" relates to a method for forming collared holes in a workplace.

U.S. Pat. No. 4,454,741 issued on Jun. 19, 1984 entitled "Flow drill for the provision of holes in sheet material" relates to a drill for the production of holes having a collar in metal sheet or metal tube walls.

SUMMARY OF THE INVENTION

It is an object of the present invention to provide a fuel rail which can eliminate the cracks in the connecting points between the conduit and the branch pipes.

It is another object of the present invention to provide a fuel rail which can be utilized over a wide range of pressures applied to the fuel.

It is still another object of the present invention to provide a fuel rail conduit and its forming method.

It is still another object of the present invention to provide a fuel rail and its conduit which can be applied to not only low pressure gasoline engines but also high pressure diesel engines.

According to a first aspect of the invention, there is provided a fuel rail assembly for an internal combustion engine comprising an elongated conduit having a longitudinal fuel passage therein. A fuel inlet pipe is fixed to an end or a side of the conduit, and a plurality of branch pipes are vertically fixed to the conduit.

Further, the invention features the following arrangement. The former end of each branch pipe is adapted to communicate with the fuel passage. The rear end of each branch pipe is provided with a connecting member for receiving a tip of a fuel injector. The wall of the conduit is provided with holes for receiving the former ends of the branch pipes. Around each hole an inner collar and an outer collar are integrally formed with the conduit wall. Each branch pipe is fixed to the collars by brazing or welding.

These features can strengthen the connecting points between the conduit and the branch pipes. The branch pipes are fixedly supported by the inner and outer collars near the penetrating points through the conduit. Further, wide areas are supplied for brazing or welding work. Both parts are firmly fixed and stress concentration can be avoided, so that crack generation is eliminated. Thus, this fuel rail assembly can be applied to not only gasoline engines but also some type of diesel engines.

Since this type of fuel rail is typically made from a circular pipe, it is preferable that the conduit has a circular section and at least each peripheral area around the outer collar is shaped into a flat plane. Then, the work for drilling a hole is applied to the flat plane, whereby the working process becomes considerably simplified.

In another way, a longitudinal side portion of the conduit can be flattened, and on the flat plane the holes and collars become to-be-easily shaped.

It is also preferable to let the inside tip of each branch pipe to-extend into the conduit at the same level or a deeper level relative to the level of the tip of the inner collar. Then, the brazing and welding works are facilitated, whereby permanent strength is maintained.

According to a second aspect of the invention, there is provided a fuel rail conduit having a longitudinal fuel passage therein and a plurality of branch pipes thereon. The invention features the following arrangement. The wall of the conduit is provided with holes for receiving the former ends of the branch pipes. Around each hole an inner collar and an outer collar are integrally formed with the conduit wall.

It is preferable that the conduit has a circular section and at least each peripheral area around the outer collar is shaped into a flat plane, so that the working process is considerably simplified.

In another way, a longitudinal side portion of the conduit can be flattened and on the flat plane the holes and collars become easily shaped.

According to a third aspect of the invention, there is provided a method of forming a fuel rail assembly including an elongated conduit having a longitudinal fuel passage therein and a plurality of branch pipes vertically fixed to the conduit.

The invention features the following steps: drilling holes on the wall of the conduit utilizing a special drilling tool for receiving the branch pipes, thereby forming an inner collar and an outer collar around each hole simultaneously with the drilling work, inserting each former end of the branch pipe into the corresponding hole, and fixing each branch pipe to the collars by brazing or welding.

The special drilling tool can be selected from those similar to the special tools described in U.S. Pat. Nos. 4,132,097 and 4,454,741. Such drills are available in the tool market by the name of "flow drill".

If the conduit has a circular section, a step of forming a flat plane on each peripheral area around the outer collar is advantageously supplemented, whereby the drilling work becomes considerably facilitated. Alternatively, a step of flattening a longitudinal side portion of the conduit is advantageously supplemented.

Further, the inserting step preferably includes a step of placing the inside tip of each branch pipe into the conduit at the same level or a deeper level relative to the level of the tip of the inner collar, whereby after the brazing or welding, permanent strength is maintained.

According to the fourth aspect of the invention, there is provided a forming method of a fuel rail conduit having a longitudinal fuel passage therein. The invention features the step of drilling holes on the wall of the conduit utilizing a special drilling tool for receiving the branch pipes thereby forming an inner collar and an outer collar around each hole simultaneously with the drilling work.

If the conduit has a circular section, a step of forming a flat plane on each peripheral area around the outer collar is advantageously supplemented, whereby the drilling work becomes considerably facilitated. Alternatively, a step of flattening a longitudinal side portion of the conduit is advantageously supplemented.

Other features and advantages of the invention will become apparent from descriptions of the embodiments, when taken in conjunction with the drawings, in in which like reference numerals refer to like elements in the several views.

DETAILED DESCRIPTION OF THE PREFERRED EMBODIMENT EMBODIMENTS

Figure 1:
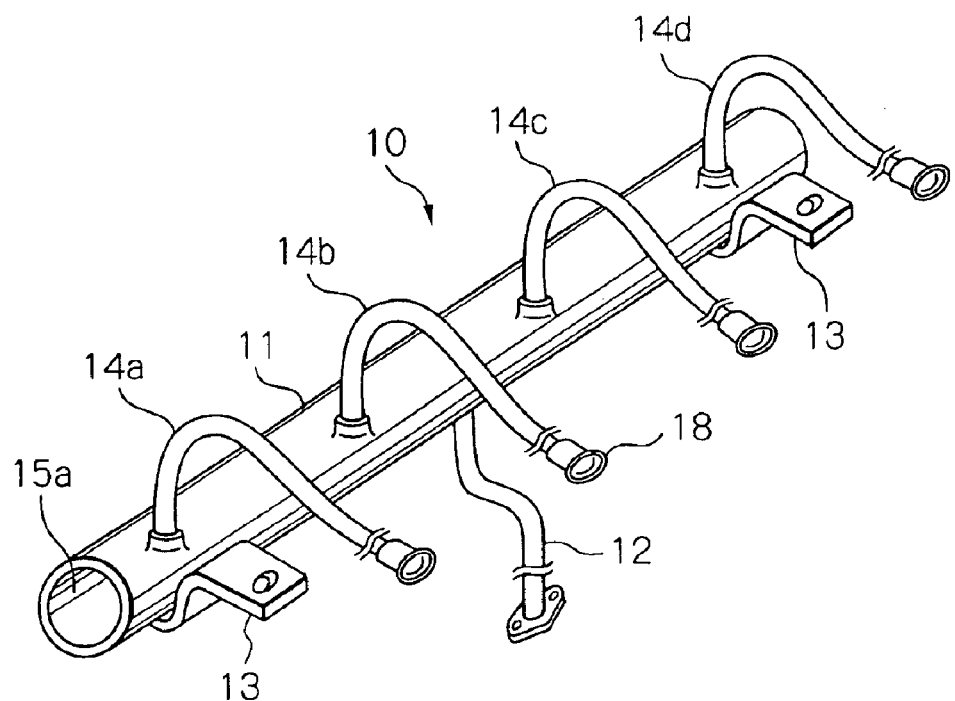
FIG. 1 is a perspective view of a fuel rail assembly according to the invention.
Figure 2:
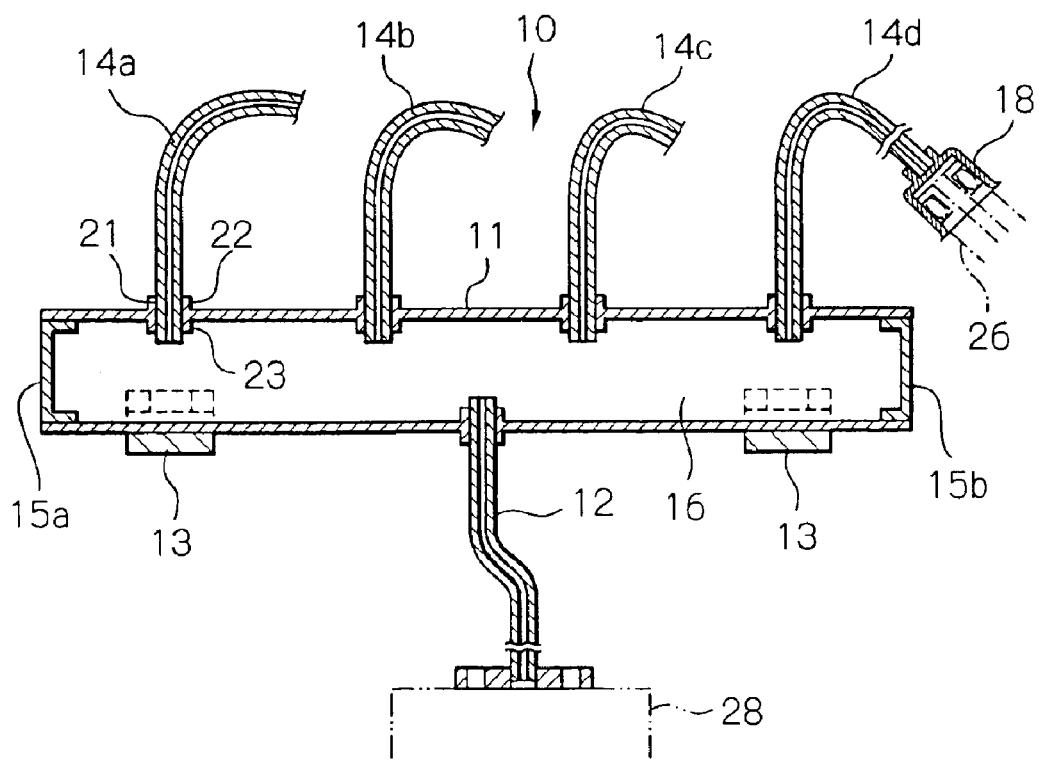
FIG. 2 is a sectional view of FIG. 1.

Referring to FIGS. 1 and 2, there is shown a first type of embodiment of the present invention, a fuel rail assembly 10, which is adapted for use in a low pressure type fuel delivery rail assembly for an automotive four-cylinder engine, especially a low pressure gasoline engine. The fuel rail assembly 10 comprises a fuel rail conduit (main pipe) 11 which has a longitudinal fuel passage 16 therein, a fuel inlet pipe 12 which is fixed to a side of the conduit, and four branch pipes 14a, 14b, 14g, 14d vertically fixed to the conduit.

The basal end of each branch pipe is adapted to communicate with the fuel passage 16, and the distal end of each branch pipe is provided with a connecting member 18 (socket) for receiving a tip of a fuel injector 26.

To the bottom of the conduit 11, two thick and rigid brackets 13 are fixed transversely so as to mount the assembly 10 onto the engine body. Longitudinal ends of the conduit 11 are sealed by the end caps 15a, 15b. The basal end of the fuel inlet pipe 12 is adapted to communicate with the fuel passage 16, and the distal end of the pipe 12 is connected to a fuel tank 28.

Based upon the characteristics of the invention, the wall of the conduit is provided with holes 21 for receiving the branch pipes 14a, 14b, 14c, 14d. Around each hole 21 an inner collar (annular wall) 23 and an outer collar 22 extend and are integrally formed with the conduit wall. The basal ends of each of the branch pipes are fixed to the collars 22, 23 by brazing or welding.

Thus, the branch pipes are fixedly supported by the inner and outer collars near the penetrating points through the conduit. Further, wide areas are supplied for brazing or welding work. Both parts are firmly fixed and stress concentration can be avoided, whereby crack generation is eliminated.

Thus, this type of fuel rail assembly is suitable for such a gasoline engine having a relatively low fuel pressure.

Figure 3:
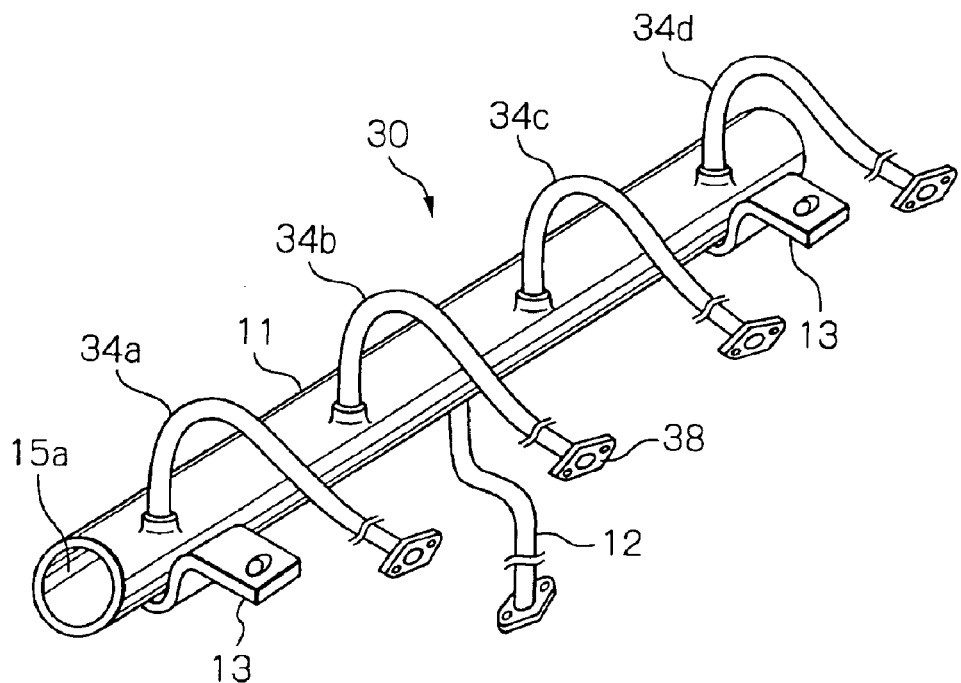
FIG. 3 is a perspective view of a fuel rail assembly according to another embodiment.
Figure 4:
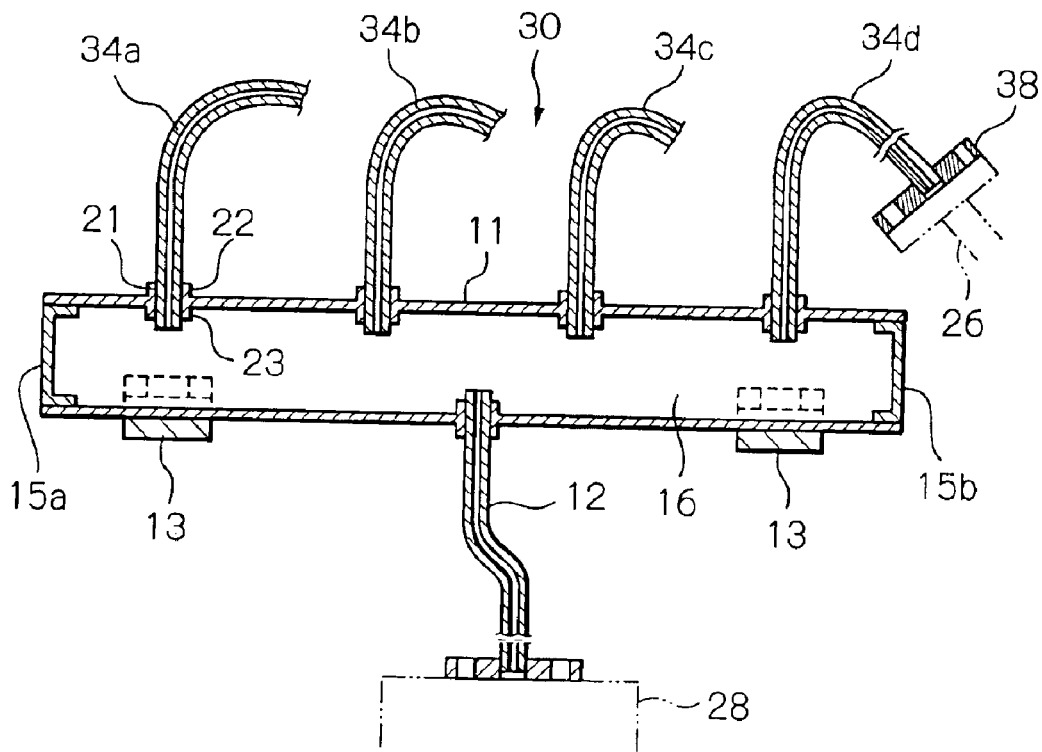
FIG. 4 is a sectional view of FIG. 3.

FIGS. 3 and 4 illustrate a second type of embodiment of the present invention, a fuel rail assembly 30, which is adapted for a medium pressure type fuel delivery rail assembly for an automotive four-cylinder engine, especially for a medium pressure gasoline engine. In this embodiment, each distal end of the branch pipes 34a, 34b, 34c, 34d is provided with a rigid flange 38 for receiving a corresponding flange accommodating a tip of a fuel injector 26. The flange 38 can bear against a little higher pressure than the arrangement of the first embodiment so as to avoid fuel leakage from the connecting points. The fuel tank 28 delivers corresponding medium pressure fuel.

Figure 5:
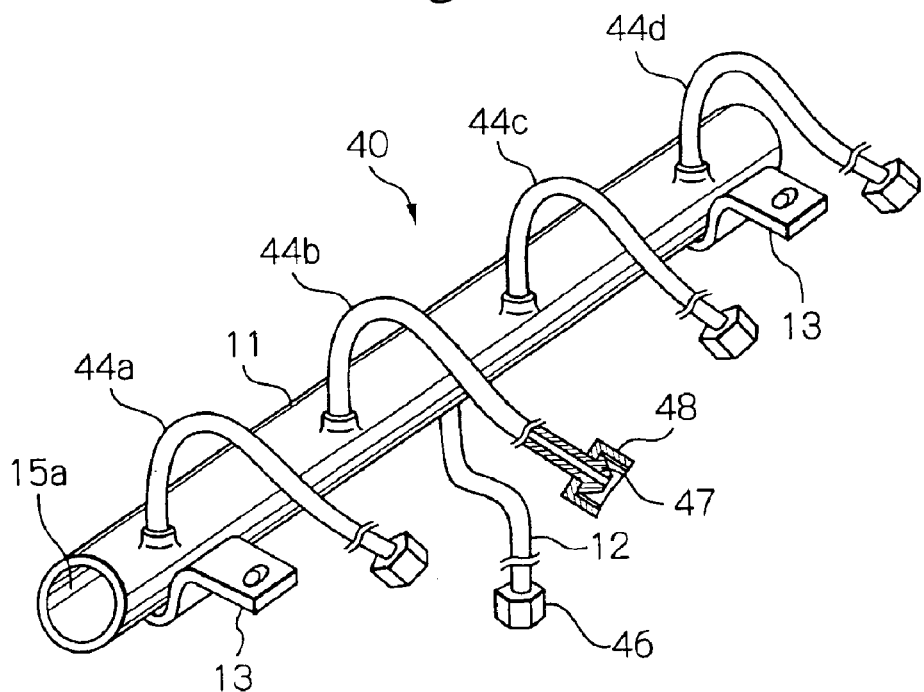
FIG. 5 is a perspective view of a fuel rail assembly according to still another embodiment.
Figure 6:
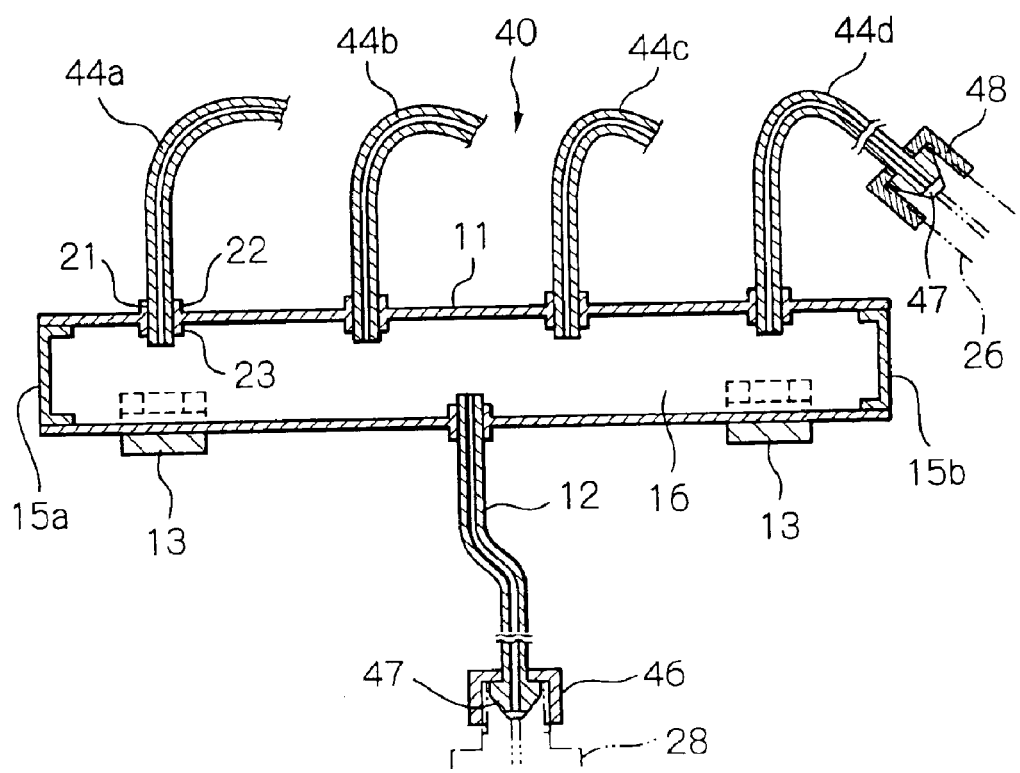
FIG. 6 is a sectional view of FIG. 5.

FIGS. 5 and 6 illustrate a third type of embodiment of the present invention, a fuel rail assembly 40, which is adapted for a high pressure type fuel delivery rail assembly for an automotive four-cylinder engine, especially for high pressure gasoline engine or some kinds of diesel engine. In this embodiment, each distal end of the branch pipes 44a, 44b, 44c, 44d is provided with a tapered end 47 and a socket nut 48 for receiving a tip of a fuel injector 26. These connecting members 47, 48 cart bear against relatively higher pressure than those of the first and second embodiments so as to avoid fuel leakage from the connecting points. The fuel tank 28 delivers corresponding high pressure fuel through the tapered end 47 and the socket nut 46.

Figure 7:
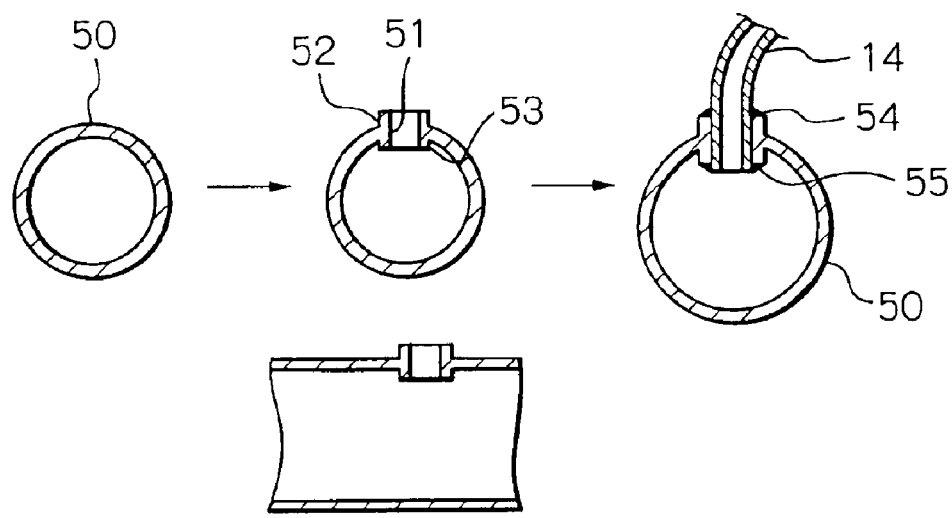
FIG. 7 illustrates sectional views of steps for forming a collared hole and a connection on the conduit.

FIGS. 7 to 10 illustrate forming methods of the fuel rail assembly and the fuel rail conduit according to the present invention. In FIG. 7, the following are illustrated. On a circular conduit 50, several holes 51 are drilled utilizing a special drilling tool such as a flow drill, and the holes each receive a branch pipe 14. As illustrated in FIGS. 7–10, an outer collar 52, 62, 72, and 82 and an inner collar 53, 63, 73, 83 are integrally formed with the wall of conduit 50, 60, 70, 80 (i.e., formed to have a one-piece construction), which allows the hole to be drilled through the inner collars 53, 63, 73, 83, through the outer collars 52, 62, 72, 62, and through the conduit wall 50, 60, 70, 80, simultaneously. In other words, the inner collar 53 and the outer collar 52 are formed around the hole 51 simultaneously with the drilling formation of the hole. Then, the basal end of the branch pipe 14 is inserted into the hole 51 and fixed to the collars 52, 53 by brazing or welding at the points 54, 55 after a temporary positioning.

Further, the inserting step preferably includes a step of inserting the inside (basal end) tip of each branch pipe 14 into the hole 51 to the same level or a deeper level relative to the level of the tip (inner surface) of the inner collar 53. Thus, after the brazing or welding, permanent strength is maintained.

Figure 8:
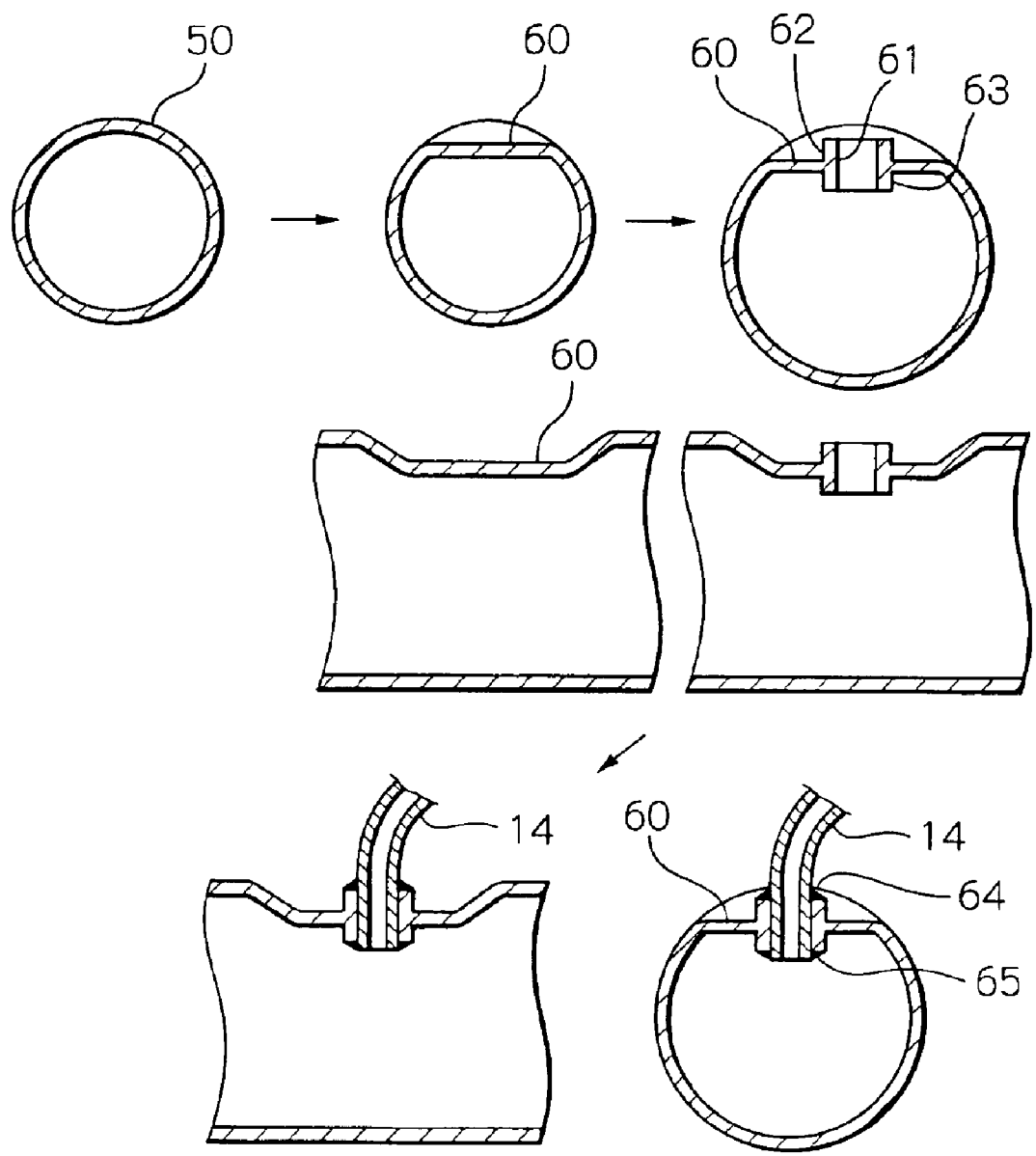
FIG. 8 illustrates sectional views of steps for forming a collared hole and a connection on the conduit.

FIG. 8 illustrates another embodiment of the forming method of the collared hole. Before forming an inner collar 63 and an outer collar 62 around the hole 61, a step of forming a flat plane 60 on each peripheral area around the outer collar 62 is added. This plane 60 can be formed by an ordinary press machine. As shown, since the conduit 50 has a tubular surface, this flat plane 60 can facilitate the drilling work of the hole 61.

Similarly to the embodiment in FIG. 7, the inner collar 63 and the outer collar 62 are formed around the hole 61 simultaneously with the drilling work.

Then, the basal end of the branch pipe 14 is inserted into the hole 61 and fixed to the collars 62, 63 by brazing or welding at the points 64, 65 after a temporary positioning.

Further, the inserting step preferably includes a step of inserting the inside (basal end) tip of each branch pipe 14 into the hole 61 at the same level or a deeper level relative to the level of the tip of the inner collar 63. Thus, after the brazing or welding, permanent strength is maintained.

Figure 9:
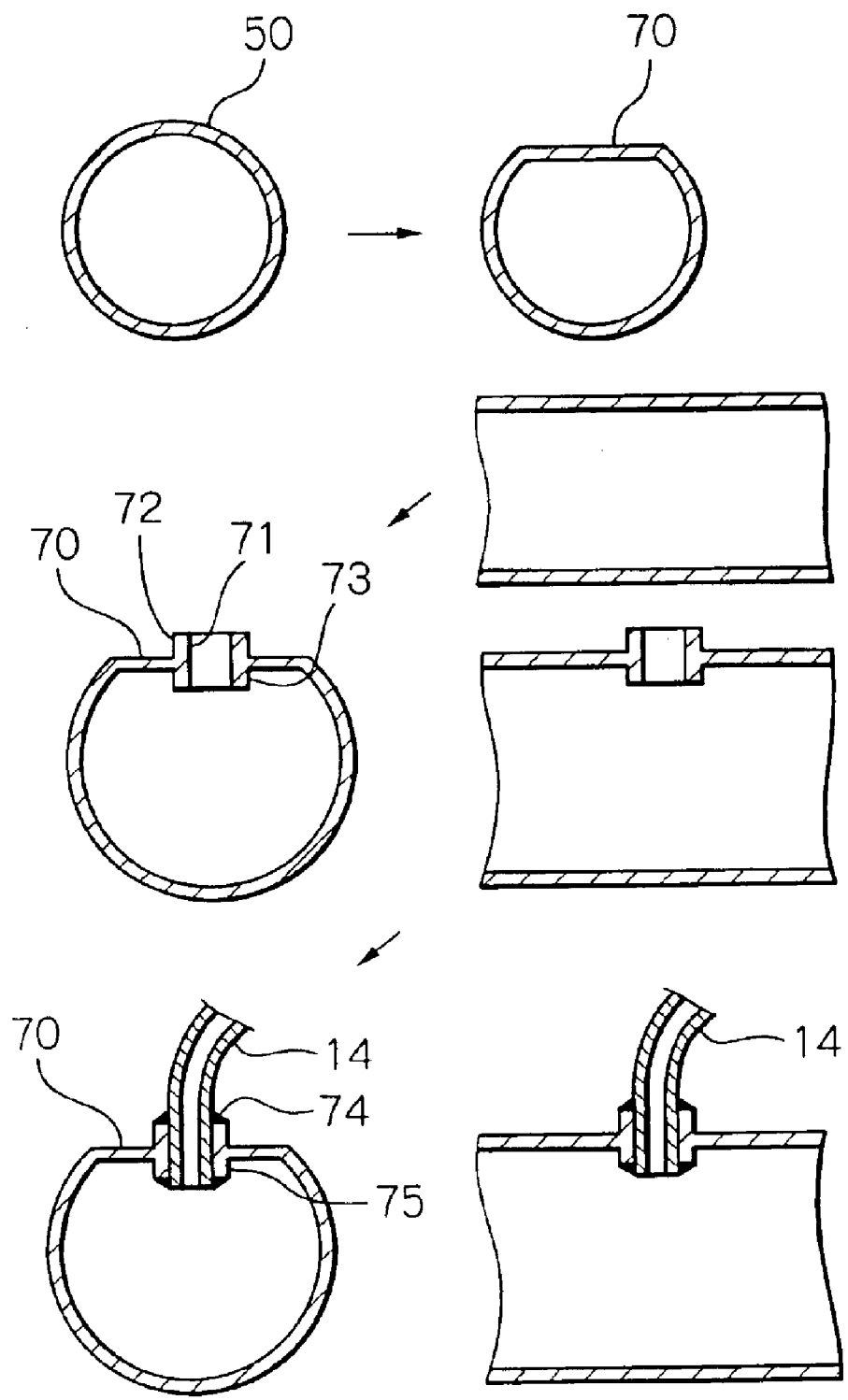
FIG. 9 illustrates sectional views of steps for forming a collared hole and a connection on the conduit.

FIG. 9 illustrates still another embodiment of the forming method of the collared hole. Before forming an inner collar 73 and an outer collar 72 around the hole 71, a step of flattening a longitudinal side portion 70 of the conduit 50 is added. As shown, since the conduit 50 has a tubular surface, this flat plane 70 can facilitate the drilling work of the hole 71. Similarly to the embodiment in FIG. 7, the inner collar 73 and the outer collar 72 are formed around the hole 71 simultaneously with the drilling work. Then, the basal end of the branch pipe 14 is inserted into the hole 71 and fixed to the collars 72, 73 by brazing or welding at the points 74, 75 after a temporary positioning.

Further, the inserting step preferably includes a step of inserting the inside (basal-end) lip of each branch pipe 14 into the hole 71 at the same level or a deeper level relative to the level of the tip of the inner collar 73. Thus, after the brazing or welding, permanent strength is maintained.

Figure 10:
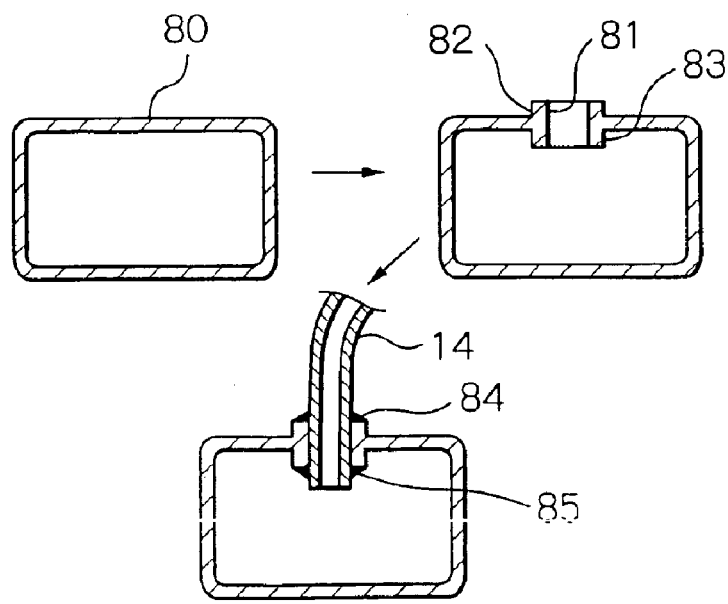
FIG. 10 illustrates sectional views of steps for forming a collared hole and a connection on the conduit.

FIG. 10 illustrates still another embodiment of the forming method of the collared hole. In this embodiment, the conduit 80 has a rectangular section, so that a step of flattening a side portion of the conduit is not needed. The flat surface of the conduit 80 facilitates the drilling work of the hole 81. Similarly to the embodiment in FIG. 7, the inner collar 83 and the outer collar 82 are formed around the hole 81 simultaneously with the drilling work. Then, the end of the branch pipe 14 is inserted into the hole 81 and fixed to the collars 82, 83 by brazing or welding at the points 84, 85 after a temporary positioning.

Further, the inserting step preferably includes a step of inserting the inside tip of each branch pipe 14 into the hole 81 at the same level or a deeper level relative to the level of the tip of the inner collar 83. Thus, after the brazing or welding, permanent strength is maintained, It should be recognized that various modifications are possible within the scope of the invention claimed.

What is claimed is:

1. A fuel rail assembly comprising:
   an elongated conduit having a longitudinal fuel passage therein, and having a plurality of holes;
   a fuel inlet pipe fixed to said conduit;
   an inner collar and an outer collar at each of said holes, each of said inner collar and said outer collar at each of said holes being integral with a wall of said conduit so as to have a one-piece construction with said wall of said conduit such that said inner collar and said outer collar at each of said holes are formed simultaneously with each respective hole by drilling; and
   a plurality of branch pipes fixed to said conduit so as to communicate with said conduit, each of said branch pipes having a basal end inserted into a respective one of said holes, and having a distal end opposite said basal end, said distal end having a connecting member to be connected to a respective fuel injector.

2. The fuel rail assembly of claim 1, wherein said conduit has a circular cross-section, and at least a peripheral area around said outer collar at each of said holes has a flat planar shape.

3. The fuel rail assembly of claim 1, wherein a tip of said basal end of each of said branch pipes extends into a respective hole of said conduit at least as far as an inner surface of said inner collar at said respective hole.

4. The fuel rail assembly of claim 1, wherein each of said branch pipes extends vertically from said conduit.

5. The fuel rail assembly of claim 1, wherein said basal end of each of said branch pipes is welded or brazed to said conduit.

6. The fuel rail assembly of claim 1, wherein said connecting member of each of said branch pipes comprises a flange.

7. The fuel rail assembly of claim 1, wherein said connecting member of each of said branch pipes comprises a socket fitting including a socket nut and a tapered pipe end.

8. The fuel rail assembly of claim 1, wherein said conduit has a rectangular cross-section.

9. The fuel rail assembly of claim 1, wherein each of said holes is shaped by being formed with a flow drill.

10. A fuel rail conduit comprising:
    a wall shaped to form a longitudinal fuel passage, said wall having a plurality of holes formed therein;
    an inner collar and an outer collar at each of said holes, each of said inner collar and said outer collar at each of said holes being integral with said wall of said conduit so as to have a one-piece construction with said wall such that said inner collar and said outer collar at each of said holes are formed simultaneously with each respective hole by drilling; and
    a plurality of branch pipes fixed to said wall at said holes by inserting a basal end of each of said branch pipes into a respective one of said holes.

11. The fuel rail conduit of claim 10, wherein said wall has a circular cross-sectional shape, and at least a peripheral area around said outer collar at each of said holes has a flat planar shape.

12. The fuel rail conduit of claim 10, wherein a tip of said basal end of each of said branch pipes extends into a respective hole of said wall at least as far as an inner surface of said inner collar at said respective hole.

13. The fuel rail conduit of claim 10, wherein each of said branch pipes extends vertically from said wall.

14. The fuel rail conduit of claim 10, wherein said basal end of each of said branch pipes is welded or brazed to said wall.

15. The fuel rail conduit of claim 10, wherein said wall has a rectangular cross-sectional shape.

16. The fuel rail conduit of claim 10, wherein each of said holes is shaped by being formed with a flow drill.

* * * * *